US009162397B2

(12) United States Patent
Katahira et al.

(10) Patent No.: US 9,162,397 B2
(45) Date of Patent: Oct. 20, 2015

(54) FIBER REINFORCED RESIN, MANUFACTURING METHOD FOR FIBER REINFORCED RESIN, AND MANUFACTURING SYSTEM FOR FIBER REINFORCED RESIN

(75) Inventors: Natsuhiko Katahira, Toyota (JP); Joji Yoshimura, Toyota (JP); Makoto Tsuzuki, Anjo (JP); Masahiko Yasue, Obu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 545 days.

(21) Appl. No.: 13/379,844

(22) PCT Filed: May 25, 2010

(86) PCT No.: PCT/IB2010/001365
§ 371 (c)(1),
(2), (4) Date: Dec. 21, 2011

(87) PCT Pub. No.: WO2010/150065
PCT Pub. Date: Dec. 29, 2010

(65) Prior Publication Data
US 2012/0141765 A1 Jun. 7, 2012

(30) Foreign Application Priority Data
Jun. 22, 2009 (JP) .................................. 2009-147381

(51) Int. Cl.
*B29C 70/48* (2006.01)
*B29C 43/34* (2006.01)
*B29C 70/46* (2006.01)

(52) U.S. Cl.
CPC ................. *B29C 70/48* (2013.01); *B29C 43/34* (2013.01); *B29C 70/467* (2013.01); *B29C 2043/3444* (2013.01); *Y10T 428/24994* (2015.04)

(58) Field of Classification Search
CPC .................. B29C 43/34; B29C 70/467; B29C 2043/3444; B29C 70/34; B29C 70/42; B29C 70/48; B29C 70/54; B29C 45/561; B29C 45/56; B29C 45/1075; B29C 45/572; B29C 2045/565; B29C 45/5625
USPC .......................................................... 264/258
See application file for complete search history.

(56) References Cited

U.S. PATENT DOCUMENTS 2,841,823 A * 7/1958 Van Hartesveldt ........... 425/399
2,901,455 A * 8/1959 Jurras ............................. 428/76
(Continued)

FOREIGN PATENT DOCUMENTS

EP          1731282 A1      12/2006
JP          52-142770 A     11/1977
(Continued)

OTHER PUBLICATIONS

International Preliminary Report on Patentability for corresponding International Patent Appliction No. PCT/IB2010/001365 issued on Aug. 11, 2011.
(Continued)

*Primary Examiner* — Matthew Daniels
(74) *Attorney, Agent, or Firm* — Sughrue Mion, PLLC (57) ABSTRACT

A first process in which a fiber reinforced base is placed in a cavity of a molding die and then resin is injected into the cavity of the molding die in a state where the molding die is opened by a sum of a distance X1 and a distance at the time of completion of molding; a second process in which the molding die is closed to a state where the molding die is opened by a sum of a distance X2 and the distance at the time of completion of molding while resin in the cavity is being drained; and a third process in which the drain of the resin from the cavity is stopped and then the molding die is closed to the distance at the time of completion of molding while a die clamping pressure is maintained at a predetermined value to cure the resin, are carried out sequentially.

3 Claims, 5 Drawing Sheets

(56) References Cited

U.S. PATENT DOCUMENTS

| | | | |
|---|---|---|---|
| 3,028,284 A | 4/1962 | Reeves | |
| 3,098,582 A * | 7/1963 | Martin | 220/613 |
| 4,207,049 A * | 6/1980 | Malo et al. | 425/129.1 |
| 4,290,744 A * | 9/1981 | Dannels et al. | 425/543 |
| 5,023,041 A * | 6/1991 | Jones et al. | 264/510 |
| 5,174,933 A * | 12/1992 | Toh et al. | 264/40.5 |
| 5,364,584 A * | 11/1994 | Imanara et al. | 264/510 |
| 5,518,385 A | 5/1996 | Graff | |
| 2002/0090873 A1 | 7/2002 | Moody | |
| 2003/0077965 A1 | 4/2003 | Mack et al. | |
| 2005/0040553 A1* | 2/2005 | Slaughter et al. | 264/40.1 |
| 2007/0063393 A1* | 3/2007 | Vernin et al. | 264/511 |

FOREIGN PATENT DOCUMENTS

| | | |
|---|---|---|
| JP | 58-145410 A | 8/1983 |
| JP | 61-179710 A | 8/1986 |
| JP | 63-286306 A | 11/1988 |
| JP | 63-288723 A | 11/1988 |
| JP | 64-038210 A | 2/1989 |
| JP | 04-144722 A | 5/1992 |
| JP | 04-316811 A | 11/1992 |
| JP | 06-155483 A | 6/1994 |
| JP | 2000-233464 A | 8/2000 |
| JP | 2002-307463 A | 10/2002 |
| JP | 2003-025346 A | 1/2003 |
| JP | 2003-071856 A | 3/2003 |
| JP | 2005-169786 A | 6/2005 |
| JP | 2005-271248 A | 10/2005 |
| JP | 2005-271551 A | 10/2005 |

OTHER PUBLICATIONS

International Search Report and Written Opinion for corresponding International Patent Application No. PCT/IB2010/001365 mailed Nov. 2, 2010.

Japanese Office Action for corresponding JP Patent Application No. 2009-147381 drafted Jun. 1, 2011.

* cited by examiner

FIBER REINFORCED RESIN, MANUFACTURING METHOD FOR FIBER REINFORCED RESIN, AND MANUFACTURING SYSTEM FOR FIBER REINFORCED RESIN

BACKGROUND OF THE INVENTION

1. Field of the Invention

The invention relates to a fiber reinforced resin, a manufacturing method for the fiber reinforced resin, and a manufacturing system for the fiber reinforced resin.

2. Description of the Related Art

A fiber reinforced resin may be manufactured by molding and curing resin containing a fiber reinforced base. In order to manufacture a high-quality fiber reinforced resin, it is necessary to uniformly impregnate resin into a fiber reinforced base. For example, in a technique described in Japanese Patent Application Publication No. 2005-271551 (JP-A-2005-271551), a gap is provided in a cavity of a molding die between a cavity inner surface and a fiber reinforced base, and an amount of resin equivalent to a molded product is injected into the gap. After that, the molding die is closed to narrow the cavity to thereby spread the resin over the fiber reinforced base. In addition, in a technique described in Japanese Patent Application Publication No. 63-286306 (JP-A-63-286306), an amount of resin that exceeds an amount of resin required for a product itself is impregnated into a fiber reinforced base in advance, and the resin-impregnated fiber reinforced base is placed in a cavity of upper and lower molding dies. Then, the molding dies are closed to introduce resin into a resin drain hole. Thus, the product is brought into close contact with the molding dies to mold the product.

In order to manufacture a fiber reinforced resin having high strength and dimensional accuracy, an appropriate amount of resin needs to be uniformly spread in the cavity and uniformly cured. In the technique described in JP-A-2005-271551, only an amount of resin equivalent to a product is injected, so the injected amount of resin tends to be excessive or insufficient. This tends to cause unevenness in quality of fiber reinforced resin. In the technique described in JP-A-63-286306, the molding dies are completely closed in the process of draining redundant resin, so sunk spots (recesses formed due to molding shrinkage of resin) appear during curing of resin thereafter. This deteriorates the strength and dimensional accuracy of the product.

SUMMARY OF THE INVENTION

The invention provides a fiber reinforced resin that has high strength and dimensional accuracy and that suppresses unevenness in quality of a product during mass production in such a manner that an appropriate amount of resin is uniformly impregnated into a cavity and is uniformly cured, and also provides a manufacturing method for the fiber reinforced resin and a manufacturing system for the fiber reinforced resin.

A first aspect of the invention relates to a manufacturing method for a fiber reinforced resin that is molded by impregnating resin into a fiber reinforced base. The manufacturing method includes: placing the fiber reinforced base in a cavity formed by a molding die; injecting resin into the cavity of the molding die that is opened by a sum of a first distance and a distance at the time of completion of molding; closing the molding die to a state where the molding die is opened by a sum of a second distance and with the distance at the time of completion of molding while the injected resin is drained from the cavity; after the molding die is closed to a state where the molding die is opened by the sum of the second distance and the distance at the time of completion of molding, stopping the drain of the resin from the cavity; and after the drain of the resin is stopped, closing the molding die to, the distance at the time of completion of molding while a clamping pressure of the molding die is maintained at a predetermined value to cure the resin.

With the above configuration, resin is injected into the cavity of the molding die in a state where the molding die is opened by a sum of the first distance and a distance at the time of completion of molding to spread the resin in a gap between the fiber reinforced base and the cavity inner surface, and then the molding die is closed to a state where the molding die is opened by a sum of the second distance and the distance at the time of completion of molding, so it is possible to uniformly impregnate the resin into the fiber reinforced base. Furthermore, the drain of the resin from the cavity is stopped in a state where the molding die is closed to a state where the molding die is opened by the sum of the second distance and the distance at the time of completion of molding, and the molding die is closed to the distance at the time of completion of molding while a die clamping pressure is maintained at a predetermined value to cure the resin. By so doing, it is possible to prevent sunk spots from appearing in a product while ensuring an appropriate amount of resin.

The manufacturing method according to the above aspect may further include placing a resin diffusion medium together with the fiber reinforced base when the fiber reinforced base is placed in the cavity. With the above configuration, by placing the resin diffusion medium at portions to which resin is hard to flow, it is possible to further uniformly impregnate the resin.

In the manufacturing method according to the above aspect, the second distance may be shorter than the first distance.

A fiber reinforced resin manufactured by the manufacturing method according to the above aspect may include a fiber reinforced base that has an upright wall portion and that is impregnated with the resin, wherein the resin impregnation of the upright wall portion may be higher than the resin impregnation of the fiber reinforced base other than the upright wall portion. The upright wall portion increases resistance at which resin flows and is impregnated. However, with the above configuration, by improving the resin impregnation of the fiber reinforced base, it is possible to further uniformly impregnate the resin.

The fiber reinforced resin manufactured by using the manufacturing method according to the above aspect may include a fiber reinforced base that is impregnated with the resin; multiple wall surfaces that extend perpendicularly to a direction in which the molding die is closed; and a coupled structure that is provided between the multiple wall surfaces and couples the multiple wall surfaces. With the above configuration, resin may move via the coupled structure, so it is possible to uniformly impregnate the resin into a component that includes multiple wall surfaces as well.

In the fiber reinforced resin manufactured by using the manufacturing method according to the above aspect, the resin impregnation of the fiber reinforced base placed in the coupled structure may be higher than the resin impregnation of the fiber reinforced base placed in a portion other than the coupled structure:

A second aspect of the invention relates to a manufacturing system for a fiber reinforced resin. The manufacturing system includes: position adjusting means that adjusts a molding die to a state where the molding die is opened by a sum of a first distance and a distance at the time of completion of molding, and that closes the adjusted molding die so that the molding die is opened by a sum of a second distance and the distance at the time of completion of molding; resin injecting means that injects resin into a cavity formed by the molding die that is adjusted to the state where the molding die is opened by the sum of the first distance and the distance at the time of completion of molding; draining means that drains redundant resin in the cavity in the process of closing the molding die to the second distance; isolating means that isolates the cavity from an outside of the molding die after the drain of the redundant resin is completed; and clamping pressure adjusting means that maintains a die clamping pressure at a predetermined value until the injected resin is cured after the cavity is isolated from the outside of the molding die.

The manufacturing system according to the above aspect may further include base holding means that holds the position of a fiber reinforced base that is impregnated with the resin. With the above configuration, when resin is injected into the cavity of the molding die in a state where the molding die is opened by the sum of the first distance and the distance at the time of completion of molding, it is possible to suppress a positional deviation of the fiber reinforced base.

In the manufacturing system according to the above aspect, the second distance may be shorter than the first distance.

According to the aspects of the invention, in the fiber reinforced resin, it is possible to uniformly spread an appropriate amount of resin in the cavity, and it is possible to uniformly cure the resin. A fiber reinforced resin having high strength and dimensional accuracy may be manufactured, and unevenness in quality of a product during mass production may be suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A major feature of embodiments described below is listed as follows. (Feature 1) A manufacturing system for a fiber reinforced resin includes decompression means.

Figure 1:
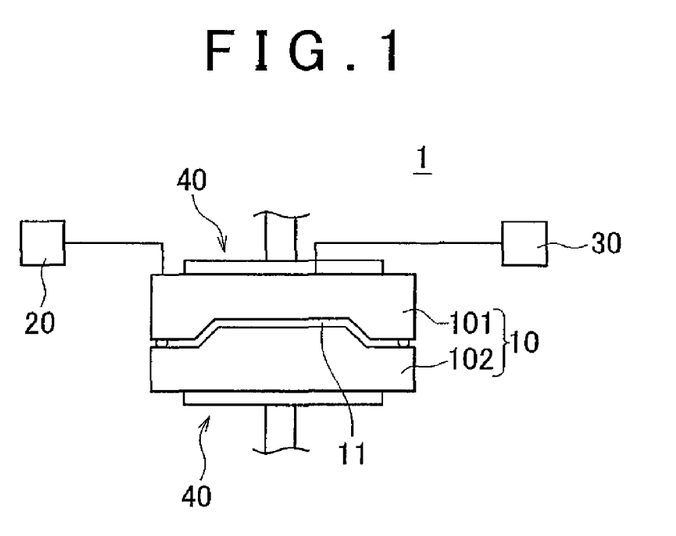
FIG. 1 is a view that shows a manufacturing system according to a first embodiment.

Hereinafter, a first embodiment of the invention will be described with reference to the accompanying drawings. FIG. 1 is a view that shows a manufacturing system 1 for a fiber reinforced resin according to the present embodiment. The manufacturing system 1 includes a molding die 10, a decompressor 20, a resin injector 30, and a die closer 40. The decompressor 20 and the resin injector 30 are connected to the molding die 10. The die closer 40 applies pressure to the molding die 10 in the vertical direction. The molding die 10 includes an upper die 101 and a lower die 102. A cavity 11 is formed between the upper die 101 and the lower die 102. The cavity 11 has a shape corresponding to the shape of a product. The manufacturing system 1 injects resin into the cavity 11 defined by the upper die 101 and the lower die 102, and cures the resin while applying pressure to the resin using the die closer 40, thus molding the injected resin. The die closer 40 includes position adjusting means (not shown) and clamping pressure adjusting means (not shown). The position adjusting means adjusts the die closing position of the molding die 10. The clamping pressure adjusting means adjusts the clamping pressure applied to the molding die 10.

Figure 2:
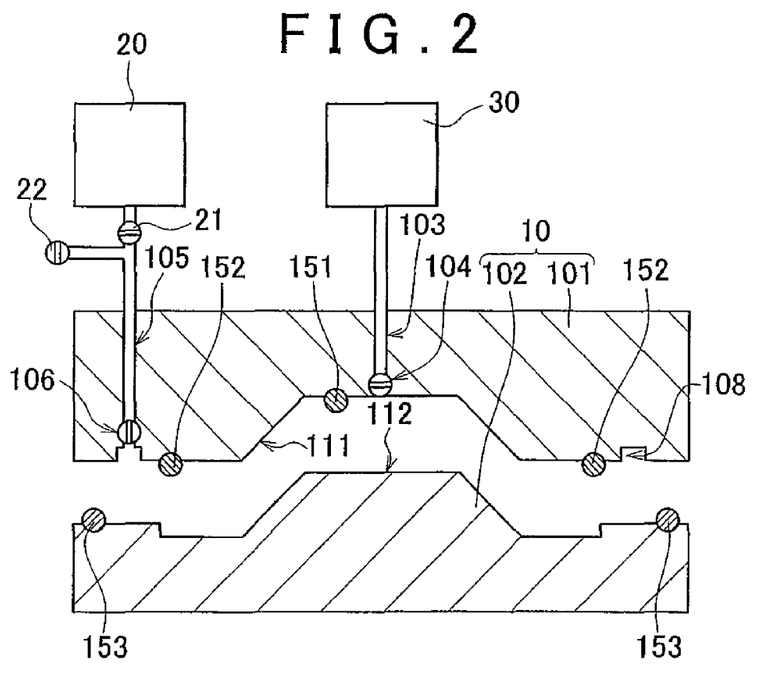
FIG. 2 is a view that shows a molding die, a decompressor, and a resin injector according to the first embodiment.

FIG. 2 is a view that shows the molding die 10 and the decompressor 20 and the resin injector 30. The decompressor 20 and the resin injector 30 are connected to the molding die 10. As shown in FIG. 2, the molding die 10 is open. As the molding die is closed, a space surrounded by a cavity surface 111 of the upper die 101 and a cavity surface 112 of the lower die 102 becomes a cavity 11. A seal member 153 formed of an elastic body is provided on an upper surface (cavity surface 112) of the lower die 102. The seal member 153 is provided along a peripheral portion of the lower die 102, and is located on an outer peripheral side with respect to the cavity surface 112. The seal member 153 surrounds the cavity surface 112. When the molding die 10 is closed, the cavity 11 is isolated from the outside by the seal member 153.

Base holding means 151 and 152 are provided on the cavity surface 111 of the upper die 102. The base holding means 151 and 152 are provided at positions at which, when the molding die 10 is closed, the base holding means 151 and 152 contact with a fiber reinforced base placed in the cavity 11. The base holding means 151 and 152 are elastic bodies. As the molding die 10 is closed, the base holding means 151 and 152 are able to hold the fiber reinforced base by the elastic force thereof. In the present embodiment, the base holding means 151 is a spherical elastic body, and the base holding means 152 is an annular elastic body that is continuous along the outer periphery of the cavity surface 111 of the upper die 102.

The upper die 101 has a drain passage 105 that is open at the cavity surface 111. The drain passage 105 is connected to the decompressor 20 via a decompression valve 21. A branch portion is connected to a resin drain valve 22. The branch portion is provided in a passage that connects the drain passage 105 with the decompression valve 21. A valve 106 is provided in the drain passage 105, and is located in proximity to the cavity surface 111. In addition, the upper die 101 has a resin injection passage 103 that connects the cavity surface 111 with the resin injector 30. A valve 104 is provided in the resin injection passage 103, and is located in proximity to the cavity surface 111. Furthermore, the upper die 101 has a resin reservoir 108. The resin reservoir 108 is located on the outer side of the cavity surface 111 and is on the inner side of a portion with which the seal member 153 of the lower die 102 contacts.

Next, a manufacturing method for a fiber reinforced resin product according to the present embodiment will be described with reference to FIG. 3 to FIG. 6. FIG. 3 to FIG. 6 show the state of the molding die 10 shown in FIG. 2. The decompressor 20 and the resin injector 30 shown in FIG. 2 are not shown in FIG. 3 to FIG. 6.

Figure 3:
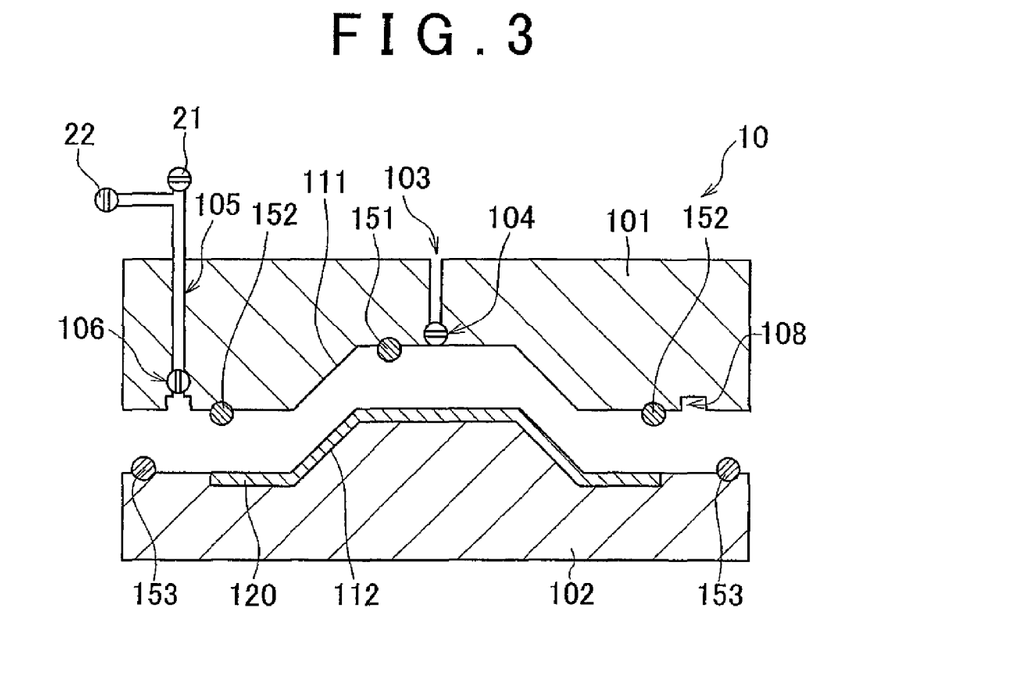
FIG. 3 is a view that illustrates a manufacturing process according to the first embodiment.

A first process according to the first embodiment will be described below. First, as shown in FIG. 3, in a state where the cavity 11 is open, a fiber reinforced base 120 is placed on the cavity surface 112 of the lower die 102 of the molding die 10. The fiber reinforced base 120 may be, for example, carbon fiber, or the like. The valve 104 provided in the resin injection passage 103 is closed, and the valve 106 provided in the drain passage 105 is open. The decompression valve 21 and the resin drain valve 22 are closed.

Figure 4:
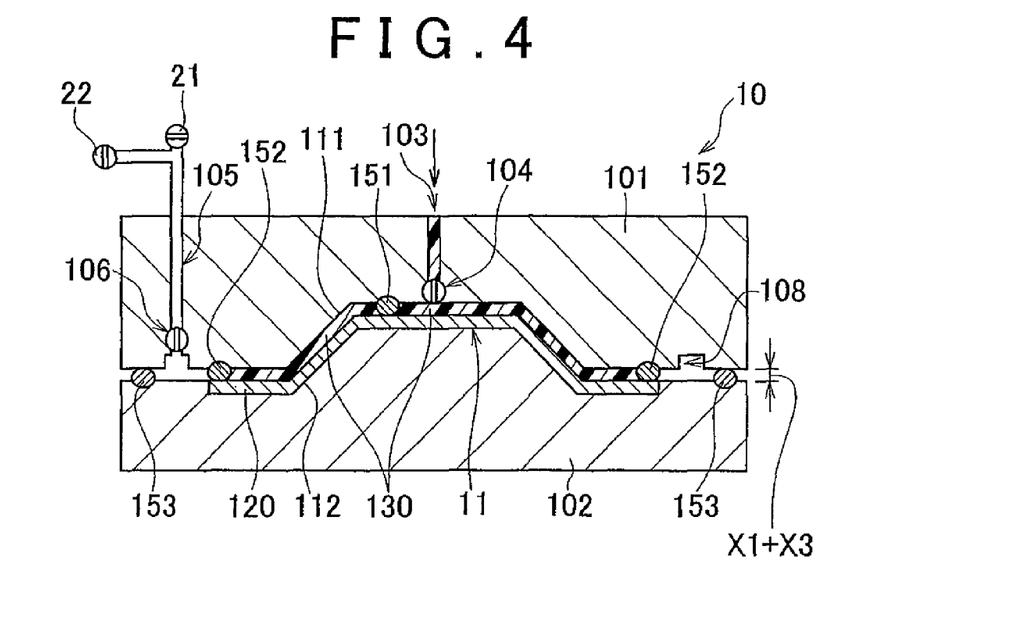
FIG. 4 is a view that illustrates the manufacturing process according to the first embodiment.

Subsequently, as shown in FIG. 4, the molding die 10 is closed to a state where the distance between the lower surface of the upper die 101 and the upper surface of the lower die 102 is opened by a sum of X1 and a distance at the time of completion of molding. In the present embodiment, the distance between the lower surface of the upper die 101 and the upper surface of the lower die 102 becomes X3 at the time of completion of molding, so, as shown in FIG. 4, the distance between the lower surface of the upper die 101 and the upper surface of the lower die 102 becomes the sum of X1 and X3. The position adjusting means provided for the die closer 40 adjusts the position to which the molding die is closed so that the distance between the lower surface of the upper die 101 and the upper surface of the lower die 102 becomes the sum of X1 and X3. X1 may be set at a value of about 0.5 mm to about 2 mm.

In this state, the seal member 153 is pressure-welded to the lower surface of the upper die 101, and the cavity 11 is isolated from the outside when the valves 104 and 106 are closed. The base holding means 151 and 152 are pressure-welded to the fiber reinforced base 120, and hold the fiber reinforced base 120 by elastic force.

In a state where the valve 104 is closed and the valve 106 is open, the decompressor 20 is operated, and the decompression valve 21 is opened to reduce the pressure in the cavity 11 through the drain passage 105. For example, until the pressure in the cavity 11 is decreased to a pressure that is lower by about 90 kPa than atmospheric pressure, the decompressor 20 is operated. Note that the resin drain valve 22 is closed.

Then, the decompressor 20 is stopped, and the decompression valve 21 is closed. Thereafter, the valve 104 is opened, and the resin injector 30 is operated to inject resin into the cavity 11 through the resin injection passage 103. An amount of resin that exceeds an amount of resin required for a fiber reinforced resin product (an amount of resin larger than a required amount of resin) is injected into the cavity 11. The distance between the lower surface of the upper die 101 and the upper surface of the lower die 102 is opened by the sum of X1 and a distance at the time of completion of molding, so, in the cavity 11, a gap having a height of about X1 is formed above the fiber reinforced base 120. Thus, as the resin is injected, as shown in FIG. 4, resin 130 spreads over the entire gap portion. The fiber reinforced base 120 is held by the base holding means 151 and 152. Therefore, even when resin is injected in a state where the gap having a height of about X1 is formed, it is possible to prevent the fiber reinforced base 120 from slipping off because of flow of resin.

Note that, in the present embodiment, the manufacturing system 1 includes the decompressor 20; however, the decompressor 20 is not an indispensable component. When the shape of a manufactured fiber reinforced resin product is simple, resin may be injected into the cavity 11 without reducing the pressure in the cavity 11 in the first process. When the shape of a manufactured fiber reinforced resin product is complex, as described in the present embodiment, resin may be injected into the cavity 11 after the pressure in the cavity 11 is reduced. By so doing, it is possible to manufacture a high-quality product with less voids.

Figure 5:
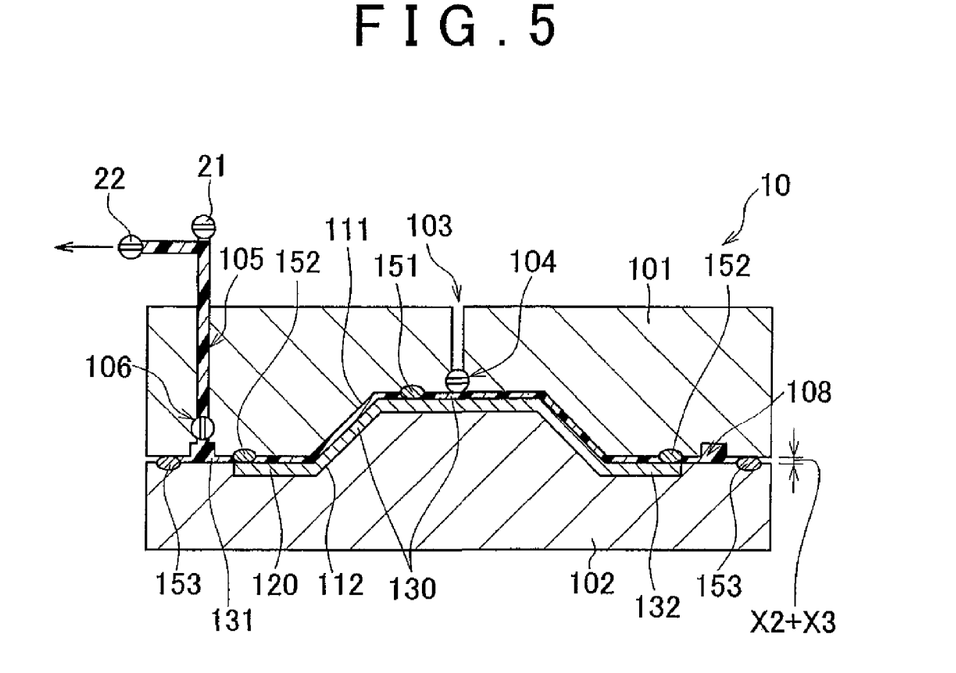
FIG. 5 is a view that illustrates the manufacturing process according to the first embodiment.
Figure 6:
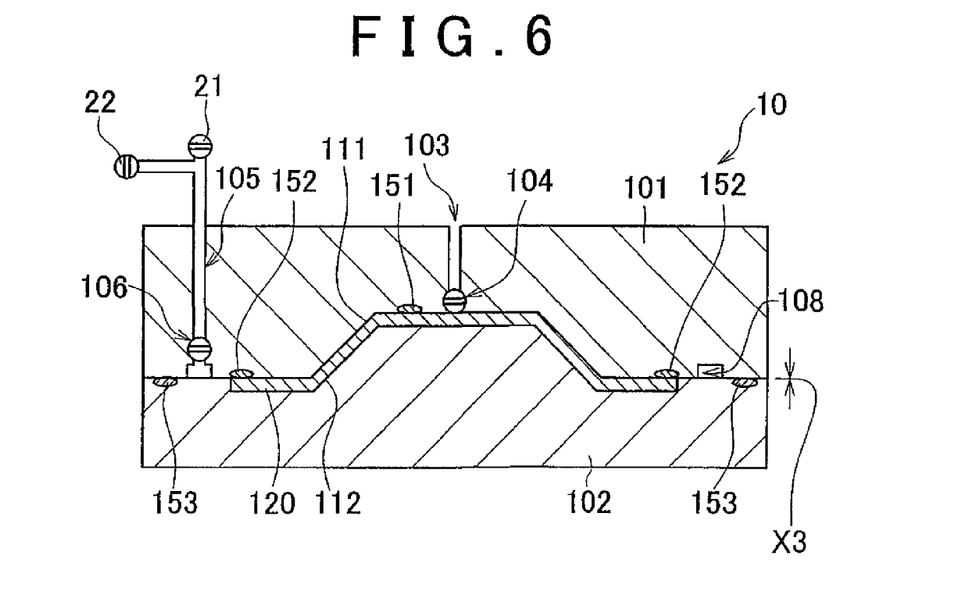
FIG. 6 is a view that illustrates the manufacturing process according to the first embodiment.

A second process according to the first embodiment will be described below. After injection of resin is completed, the valve 104 is closed. While the valve 106 is left open, the die closing position is adjusted by the position adjusting means provided for the die closer 40 so that the distance between the lower surface of the upper die 101 and the upper surface of the lower die 102 becomes the sum of X2 and X3. By so doing, the molding die 10 is closed to a state where the molding die 10 is opened by a sum of X2 and the distance at the time of completion of molding. Here, X2 is shorter than X1. Therefore, the volume in the cavity 11 reduces, and the resin 130 filled in the gap having a height of about X1 in the first process is pushed out toward the fiber reinforced base 120. Thus, the fiber reinforced base 120 is impregnated with resin. Redundant resins 131 and 132 pass by the fiber reinforced base 120 and flow out to the outside of the base holding means 152. Then, the redundant resins 131 and 132 accumulate in the resin reservoir 108, and then move to the drain passage 105. Thus, the resin drain valve 22 is opened where necessary to drain the redundant resins. X2 is shorter than X1, and may be set at a value of about 3 to 15 percent of the thickness of a product (fiber reinforced resin).

Note that, in the present embodiment, one drain passage 105 is provided; instead, a plurality of drain passages may be provided. In addition, internal pressure detecting means that detects the internal pressure in the cavity 11 may be further provided. By so doing, for example, the internal pressure in the cavity 11 is detected, and the open/close states of the plurality of drain passages (the timings and opening degrees at which the drain passages are opened or closed, the number of drain passages opened, a combination of the drain passages opened, and the like) are adjusted on the basis of the detected internal pressure. Thus, the internal pressure in the cavity 11 may be controlled. In this manner, it is possible to further uniform the state of flow of resin and the state of impregnation of resin into the fiber reinforced base.

A third process according to the first embodiment will be described below. After the drain of resin is completed, the valve 106 of the drain passage 105 is closed. Subsequently, die clamping pressure adjusting means provided for the die closer 40 is used to apply a predetermined constant die clamping pressure to the molding die 10. The die closer 40 includes means for applying die clamping pressure to the molding die 10, and may be a hydraulic press, a pneumatic press, a servomotor, and the like. The die clamping pressure adjusting means adjusts the means for applying die clamping pressure to maintain die clamping pressure until the distance between the lower surface of the upper die 101 and the upper surface of the lower die 102 changes from the sum of X2 and X3 to X3. In a state where the die clamping pressure adjusting means maintains die clamping pressure, the injected resin is cured.

With the progress of curing of resin, the resin shrinks. In the present embodiment, constant die clamping pressure is applied to the molding die 10 by the die clamping pressure adjusting means provided for the die closer 40, so the molding die 10 is gradually closed with a shrinkage of resin, and then becomes the state shown in FIG. 6. At the time of completion of molding shown in FIG. 6, the distance between the lower surface of the upper die 101 and the upper surface of the lower die 102 becomes X3. After the molding die 10 becomes the state shown in FIG. 6, and curing of resin is completed, the molding die 10 is opened and then the fiber reinforced resin molded product is taken out.

As described above, in the present embodiment, in the first process, resin is injected into the cavity of the molding die that is opened by the sum of the distance X1 and the distance at the time of completion of molding to thereby spread resin in the gap between the fiber reinforced base and the inner surface of the cavity, and, after that, in the second process, the molding die is closed to a state where the molding die is opened by the sum of the distance X2 and the distance at the time of completion of molding. Thus, it is possible to uniformly impregnate resin into the fiber reinforced base. Furthermore, in the third process, the drain of resin in the cavity is stopped in a state where the molding die is closed to a state where the molding die is opened by the sum of the distance X2 and the distance at the time of completion of molding, and, while a die clamping pressure is maintained at a predetermined value to cure the resin, the molding die is closed to the distance at the time of completion of molding. Thus, it is possible to prevent sunk spots from appearing in a product while ensuring an appropriate amount of resin.

In addition, by appropriately controlling the distance X1 in the first process, it is possible to appropriately control the amount of redundant resin drained in the second process to thereby prevent an excessive increase in pressure of resin. In addition, by appropriately controlling the distance X2 in the second process, it is possible to appropriately control the amount of resin of a product. An appropriate amount of resin may be controlled by controlling the distances X1 and X2, so it is not necessary to strictly control the amount of resin injected by the resin injector, and it is possible to suppress unevenness in the amount of resin among products during mass production.

A case where a fiber reinforced resin product that contains a core material therein is manufactured using a molding die 50 shown in FIG. 7 will be described in a second embodiment. The molding die 50 shown in FIG. 7 is installed in the manufacturing system 1 shown in FIG. 1 instead of the molding die 10, and then the first process, second process and third process described in the first embodiment are carried out to thereby make it possible to manufacture a fiber reinforced resin product that contains a core material therein.

Figure 7:
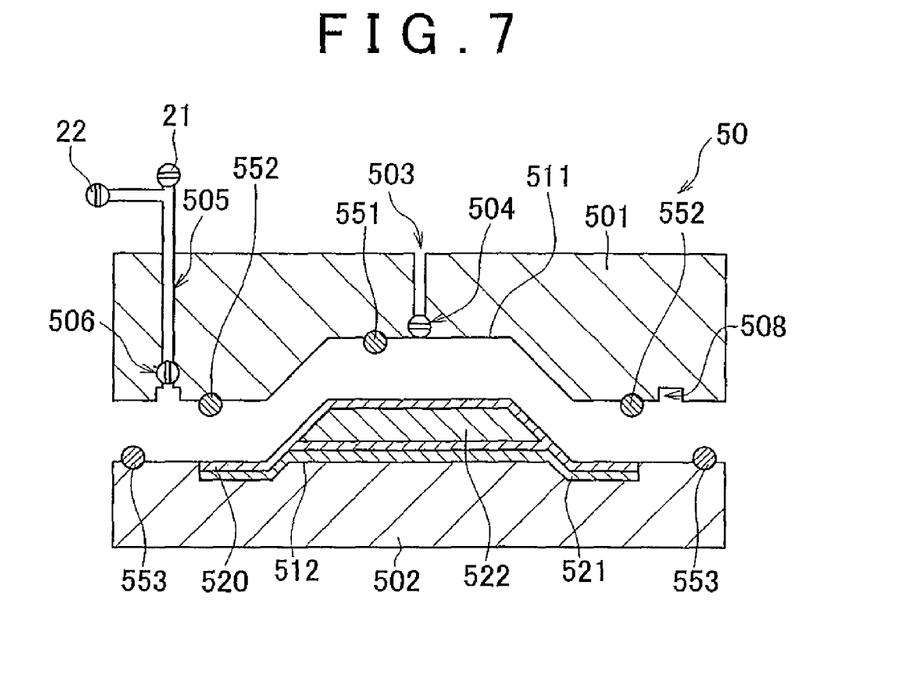
FIG. 7 is a view that shows a state where a fiber reinforced base, and the like, is placed in a molding die according to a second embodiment.

As shown in FIG. 7, the molding die 50 is formed so that a projection of a cavity surface 512 of a lower die 502 is lower than that of the cavity surface 112 of the molding die 10 shown in FIG. 2. The other configuration is similar to that of the molding die 10, so reference numerals of the one hundreds assigned to components of the molding die 10 shown in FIG. 2 are read as reference numerals of the five hundreds, and the detailed description thereof is omitted.

In the second embodiment, in the first process, as shown in FIG. 7, a resin diffusion medium 521 is placed on the cavity surface 512 of the lower die 502, and a fiber reinforced base 520 that contains a core material 522 therein is placed on the resin diffusion medium 521. The core material 522 may be, for example, rigid urethane foam or polymethacrylic foam. The fiber reinforced base 520 may be, for example, carbon fiber.

The resin diffusion medium 521 is placed in order to ensure a space for allowing resin to flow between the fiber reinforced base 520 and the cavity surface 512 of the lower die 502. The resin diffusion medium 521 may be, for example, nylon mesh having a thickness of 0.8 mm and an open area ratio of 80 percent or above.

When the molding die 50 is used, in the first process, as resin is injected through the resin injection passage 503 formed in the upper die 501, the fiber reinforced base 520 and the core material 522 are pressed against the cavity surface 512 of the lower die 502 by the pressure of resin. When no resin diffusion medium 521 is provided between the cavity surface 512 and the fiber reinforced base 520, as the fiber reinforced base 520 and the core material 522 are pressed against the cavity surface 512 of the lower die 502, a portion of the fiber reinforced base 520 adjacent to the cavity surface 512 is hard to be impregnated with resin. In this case, resin may also be impregnated into a portion of the fiber reinforced base 520 adjacent to the cavity surface 512 by further increasing the pressure of resin, or the like. However, there is a possibility that resin penetrates into the core material 522 or the pressure of resin exceeds the withstanding pressure of the seal member 553 of the molding die 50 because of an increase in the pressure of resin.

In the present embodiment, the resin diffusion medium 521 is placed between the cavity surface 512 and the fiber reinforced base 520. Therefore, even when the fiber reinforced base 520 and the core material 522 are pressed against the cavity surface 512 of the lower die 502 by the pressure of resin, the fiber reinforced base 520 is distanced from the cavity surface 512 by the resin diffusion medium 521. The resin diffusion medium 521 is made of a material having a high open area ratio. Thus, a space for allowing resin to flow is ensured. Resin flows through the resin diffusion medium 521 placed between the fiber reinforced base 520 and the cavity surface 512, so it is possible to also impregnate resin into a portion of the fiber reinforced base 520 adjacent to the cavity surface 512 without increasing the pressure of resin.

As described above, when the molding die 50 according to the present embodiment is used to carry out the first process, second process and third process described in the first embodiment, it is possible to manufacture a fiber reinforced resin product having multiple walls perpendicular to a direction in which the molding die is closed, using a core material, or the like. In this case, when the resin diffusion medium is placed at a portion to which resin is hard to flow, it is possible to further uniformly impregnate resin without increasing the pressure of resin.

A case where a fiber reinforced resin product that contains an upright wall portion is manufactured using a molding die 60 shown in FIG. 8 will be described in a third embodiment. The molding die 60 shown in FIG. 8 is installed in the manufacturing system 1 shown in FIG. 1 instead of the molding die 10, and then the first process, second process and third process described in the first embodiment are carried out to thereby make it possible to manufacture a fiber reinforced resin product that contains an upright wall portion.

Figure 8:
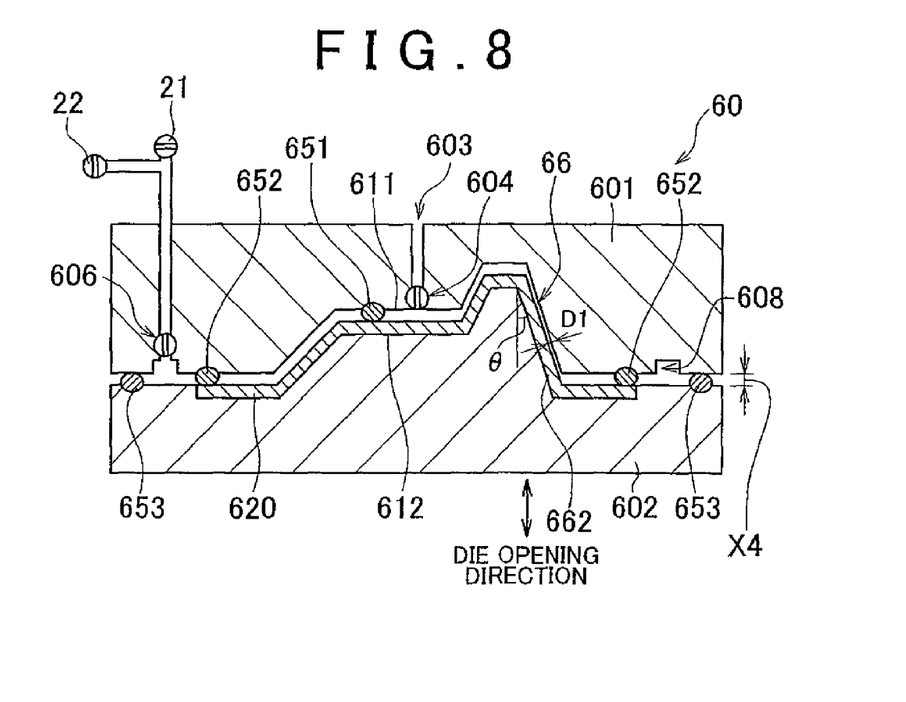
FIG. 8 is a view that shows a state where a fiber reinforced base is placed in a molding die according to a third embodiment.

As shown in FIG. 8, the molding die 60 includes the cavity surfaces 111 and 112 of the molding die 10 shown in FIG. 2 and an upper die 601 and a lower die 602 that respectively have cavity surfaces 611 and 612 having different shapes. FIG. 8 shows a state where the distance between the lower surface of the upper die 601 and the upper surface of the lower die 602 is X4 and a state where the molding die 60 is closed to a state where the molding die is opened by the sum of X1 and the distance at the time of completion of molding. An upright wall portion 66 is formed in the cavity of the molding die 60. The other configuration of the molding die 60 is similar to that of the molding die 10, so reference numerals of the one hundreds assigned to components of the molding die 10 shown in FIG. 2 are read as reference numerals of the six hundreds and the detailed description thereof is omitted.

The upright wall portion 66 is a portion that makes an angle $\theta$ (draft angle) of $0 \leq \theta \leq 15°$ between a cavity surface 612 of the lower die 602 or a cavity surface 611 of the upper die 601 and a die opening direction, in which a fiber reinforced resin product is released, shown in the lower side in FIG. 8. Where a distance at the upright wall portion 66 perpendicular to the cavity surfaces 611 and 612 is D1, the distance D1 is obtained by $X4 \sin \theta$ using a distance X4 between the lower surface of the upper die 601 and the upper surface of the lower die 602. 0≤sin θ≤sin 15°, and sin 15°=0.259, so D1 is about a quarter of X4. Similarly, when θ=5°, D1 is about a tenth of X4. As the drag angle θ decreases, D1 decreases with respect to X4. D1 is the width of a flow passage of resin in the upright wall portion 66, so, in the upright wall portion 66, the distance D1, which is the width of the flow passage of resin, is remarkably small with respect to the distance X4 between the lower surface of the upper die 601 and the upper surface of the lower die 602. Therefore, resin flows harder in the upright wall portion 66 than in the other portion. When the upright wall portion 66 is large or when the viscosity of resin is high (including when a rate of increase in viscosity is high in the process of curing resin), it is difficult to impregnate resin into a fiber reinforced base 662 in the upright wall portion 66.

In the present embodiment, the resin impregnation of the fiber reinforced base 662 of the fiber reinforced base 660, placed in the upright wall portion 66, is higher than the resin impregnation of the fiber reinforced base 620 placed in the other portion (portion of which the draft angle is larger than 15°). For example, the resin impregnation may be increased by reducing the mass per unit area of the fiber reinforced base. In addition, when comparison is made at the same mass per unit area, a plain base has a resin impregnation higher than that of a multi-axial base, so the plain base may be used as the fiber reinforced base 662 placed in the upright wall portion 66.

Specifically, for example, when a carbon fiber multi-axial base having a fiber volume content (Vf) of 55 percent is used as the fiber reinforced base 620, a carbon fiber multi-axial base having a Vf of 45 percent may be used as the fiber reinforced base 662. Alternatively, for example, a carbon fiber plain base having a Vf of 55 percent may be used as the fiber reinforced base 662.

As described above, when the molding die 60 according to the present embodiment is used to carry out the first process, second process and third process described in the first embodiment, it is possible to manufacture a fiber reinforced resin product having an portion corresponding to the upright wall portion 66. When the upright wall portion 66 is large or when the viscosity of resin is high, a fiber reinforced resin product is designed so that the resin impregnation of the portion corresponding to the upright wall portion 66 in which resin is hard to flow is higher than the resin impregnation of the fiber reinforced base 620 placed in the other portion. By so doing, it is possible to uniformly impregnate resin in the upright wall portion 66 as well, and a product having high strength and dimensional accuracy may be obtained.

Note that even when the configuration that "in a fiber reinforced resin product having an upright wall portion, the resin impregnation of a fiber reinforced base placed in the upright wall portion is higher than the resin impregnation of a fiber reinforced base placed in the other portion" described in the present embodiment is applied to a manufacturing method other than the manufacturing method that includes the first process, second process and third process according to the first embodiment, the advantageous effect that resin is more easily uniformly impregnated into the upright wall portion may be obtained.

Figure 9:
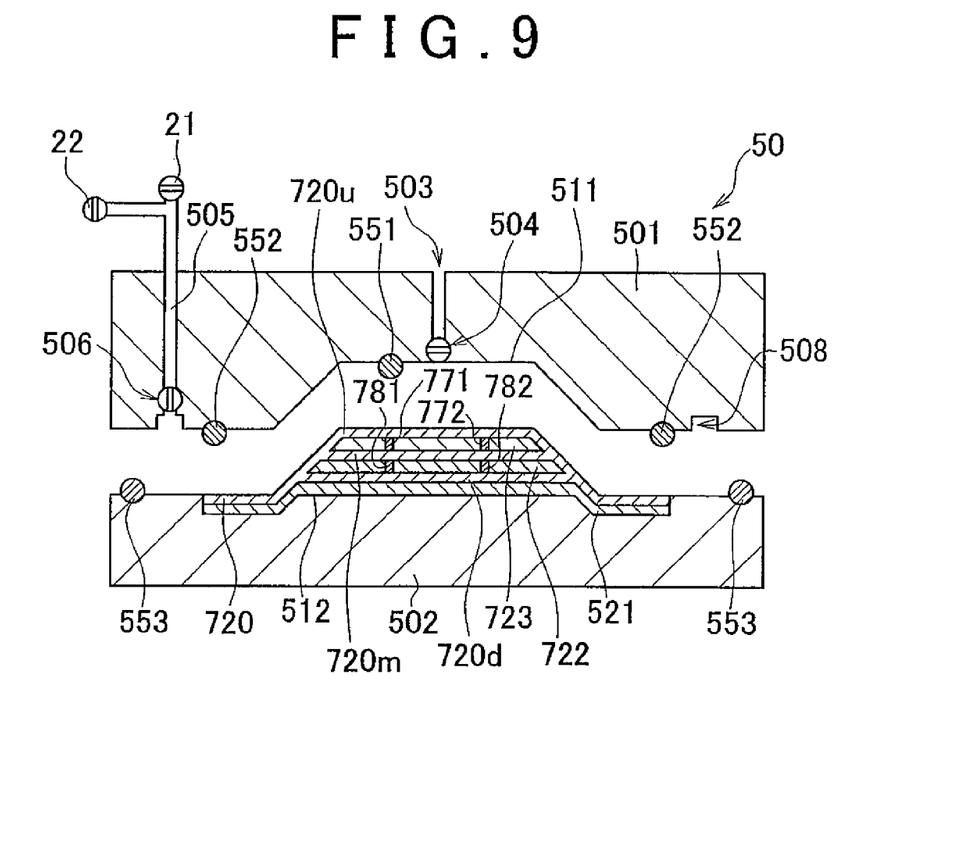
FIG. 9 is a view that shows a state where a fiber reinforced base is placed in a molding die according to a fourth embodiment.

A case where a fiber reinforced resin product that contains a core material therein is manufactured using a molding die 50 shown in FIG. 9 will be described in a fourth embodiment. The molding die 50 shown in FIG. 9 is installed in the manufacturing system 1 shown in FIG. 1 instead of the molding die 10, and then the first process, second process and third process described in the first embodiment are carried out to make it possible to manufacture a fiber reinforced resin product that contains a core material therein. The molding die 50 shown in FIG. 9 is the same as the molding die shown in FIG. 7, so the overlap description is omitted.

In the present embodiment, as shown in FIG. 9, a fiber reinforced base 720 that contains core materials 722 and 723 therein is placed in the molding die 50. The core materials and the fiber reinforced base may be, for example, the materials described in the second embodiment. The core material 723 is placed between the upper surface portion 720*u* and middle portion 720*m* of the fiber reinforced base 720. The core material 722 is placed between the middle portion 720*m* and lower surface portion 720*d* of the fiber reinforced base 720. A plurality of ribs 771 and 772 extend through the core material 723 from the upper surface portion 720*u* of the fiber reinforced base 720 toward the middle portion 720*m* thereof, and a plurality of ribs 781 and 782 extend trough the core material 722 from the middle portion 720*m* of the fiber reinforced base 720 toward the lower surface portion 720*d* thereof. The rib 771 is coupled to the rib 781 via the middle portion 720*m*. The rib 772 is coupled to the rib 782 via the middle portion 720*m*.

In the present embodiment, the above fiber reinforced base 720 is used to carry out the first process, second process and third process described in the first embodiment to thereby manufacture a fiber reinforced resin product that includes multiple wall surfaces (the upper surface portion 720*u*, middle portion 720*m* and lower surface portion 720*d* of the fiber reinforced base 720) perpendicular to the die closing direction, and that has a coupled structure (ribs 771, 772, 781 and 782) between the multiple wall surfaces. In the present embodiment, when resin is injected through the resin injection passage 503 formed in the upper die 501, the resin flows from the upper surface portion 720*u* of the fiber reinforced base 720 to the middle portion 720*m* thereof via the ribs 771 and 772. Similarly, the resin flows from the middle portion 720*m* of the fiber reinforced base 720 to the lower surface portion 720*d* thereof via the ribs 781 and 782. By so doing, resin is supplied to the middle portion 720*m* and the lower surface portion 720*d* that are located further away from the resin injection passage 503.

As described above, when the molding die 50 according to the present embodiment is used to carry out the first process, second process and third process described in the first embodiment to thereby manufacture a fiber reinforced resin product having multiple wall surfaces, a fiber reinforced resin product is designed so that the coupled structure (ribs 771, 772, 781 and 782) that couples the mutual multiple wall surfaces couples a wall surface portion (for example, the upper surface portion 720*u*), to which resin is easily supplied, to a wall surface portion (for example, the middle portion 720*m* and the lower surface portion 720*d*), to which resin is hard to be supplied. By so doing, a flow passage of resin is ensured, so it is possible to further uniformly impregnate resin, and a produce having high strength and dimensional accuracy may be obtained.

Figure 10:
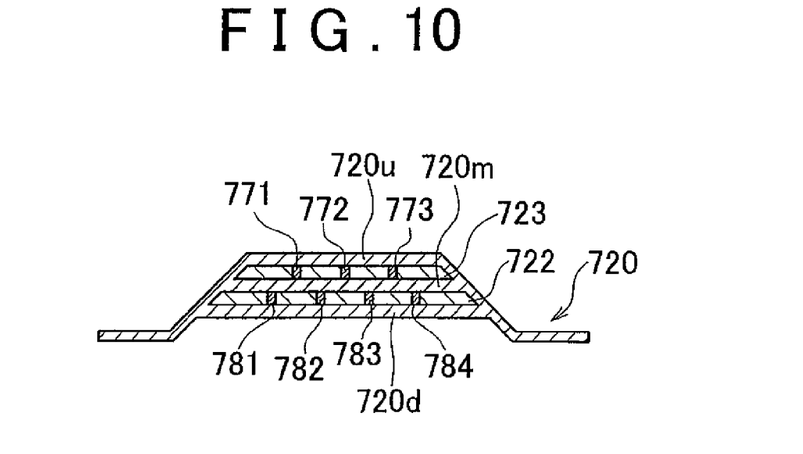
FIG. 10 is a view that shows a fiber reinforced base according to an alternative embodiment to the embodiments.

Note that, in the fiber reinforced resin that includes the multiple wall surfaces and the coupled structure according to the present embodiment, it is also applicable that, as shown in FIG. 10, ribs 771 to 773 and ribs 781 to 784 are not coupled to each other via the middle portion 720*m*. Any one of the ribs 771 to 773 (for example, the rib 771) may be formed between any two adjacent ribs among the ribs 781 to 784 (for example, between the rib 781 and the rib 782).

In addition, for example, a fiber reinforced base or the resin diffusion medium described in the second embodiment may be filled in the ribs 771 to 773 and ribs 781 to 784 shown in FIG. 9 or FIG. 10. When the fiber reinforced base 720 is pressed by the pressure of resin, or the like, it is possible to prevent the ribs from being narrowed or closed. In addition, when a fiber reinforced base is filled into the ribs 771 to 773 and the ribs 781 to 784, the resin impregnation of the filled fiber reinforced base may be higher than the resin impregnation of the fiber reinforced base of the other portion.

Note that, even when the configuration that "in the fiber reinforced resin product having multiple wall surfaces, the coupled structure that couples the mutual multiple wall surfaces couples the wall surface portion, to which resin is more easily supplied, to the wall surface portion, to which resin is hard to be supplied" is applied to a manufacturing method other than the manufacturing method that includes the first process, second process and third process according to the first embodiment, the advantageous effect that resin is easily impregnated into the wall surface portion, to which resin is hard to be supplied, may be obtained.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A manufacturing method for a fiber reinforced resin that is molded by impregnating resin into a fiber base, comprising:
    placing a fiber base in a cavity formed by a molding die, wherein the molding die includes a resin injection passage, a drain passage, fiber base holding bodies, and an elastic seal member, and the elastic seal member isolates the cavity from an outside of the molding die, except for the resin injection passage and the drain passage, when the molding die is closed;
    injecting resin into the cavity of the molding die that is opened by a sum $X1+X3$ of a first distance $X1$ and a completion distance at the time of completion of the molding $X3$ while the cavity is isolated from the outside of the molding die, except for the resin injection passage and the drain passage;
    closing the molding die until the molding die is opened by a sum $X2+X3$ of a second distance $X2$ and the completion distance at the time of completion of molding $X3$ while the injected resin is drained from the cavity;
    after the molding die is closed to a state where the molding die is opened by the sum $X2+X3$ of the second distance $X2$ and with the completion distance at the time of completion of molding $X3$, stopping the drain of the resin from the cavity; and
    after the drain of the resin is stopped, closing the molding die to the completion distance at the time of completion of molding $X3$ while a clamping pressure of the molding die is maintained at a predetermined value to cure the resin.

2. The manufacturing method according to claim 1, further comprising placing a resin diffusion medium together with the fiber base when the fiber base is placed in cavity.

3. The manufacturing method according to claim 1, wherein the second distance $X2$ is shorter than the first distance $X1$.

* * * * *